Feb. 4, 1969    C. BERGER    3,425,871
BATTERY SEPARATOR AND BATTERY INCORPORATING SAID SEPARATOR
Filed Feb. 18, 1966

CARL BERGER
INVENTOR.

BY Mat Golden

ATTORNEY

United States Patent Office 3,425,871
Patented Feb. 4, 1969

3,425,871
BATTERY SEPARATOR AND BATTERY
INCORPORATING SAID SEPARATOR
Carl Berger, Santa Ana, Calif., assignor, by mesne assignments, to McDonnell Douglas Corporation, Santa Monica, Calif., a corporation of Maryland
Filed Feb. 18, 1966, Ser. No. 528,547
U.S. Cl. 136—6
Int. Cl. H01m 3/04
22 Claims

ABSTRACT OF THE DISCLOSURE

Separator construction especially designed for incorporation in multiple plate batteries, comprising a flexible, preferably synthetic resinous, sheet having a plurality of porous substantially rigid inorganic separators mounted in openings and connected to the flexible sheet, and in spaced relation on said sheet. Such separator construction can be assembled in sinuous or coiled fashion around the electrodes in the battery case, with the inorganic separator elements properly positioned between positive and negative pairs of electrodes.

---

This invention relates to separators for electric batteries and cells, and is particularly concerned with the provision of a separator structure composed of a plurality of inorganic battery separators or separator elements assembled in novel manner as a unit, for use in multiple plate or multiple electrode cells and batteries. The invention is also concerned with novel multiplate or multielectrode batteries incorporating such novel separator structures.

Batteries are an important source of energy storage for power generation. In addition to the common lead-acid storage battery, an important type of battery particularly suited for airborne applications are the high energy density alkaline electrolyte cells using such electrode combinations as silver-zinc, silver-cadmium and nickel-cadmium. High energy density batteries are generally battery systems which have a substantially higher energy per unit of weight than conventional, e.g., lead-acid storage batteries. Thus, high energy density batteries can develop, e.g., 100 to 140 watt-hours of energy per pound. In addition to important airborne applications, such high energy density batteries have many other applications such as in portable tools and appliances, television, radio and record players, engine starting, portable X-ray units and the like.

In most practical applications in order to obtain a higher power output, multiple plate batteries or cells, e.g., of the types noted above, are employed. It is customary in the art of multiple plate cells to employ as a separator between adjacent positive and negative electrodes a semipermeable or permeable sheet material, for example, regenerated cellulose, which is wrapped around the electrodes.

However, it has been found that various porous inorganic separator materials such as hydrous metal oxides and aluminosilicates provide superior separator materials having improved properties over the organic separators such as the regenerated cellulose separators of the prior art. Such improved inorganic separators are described and claimed in the copending applications Ser. No. 379,093, filed June 30, 1964, by Carl Berger et al.; Ser. No. 378,858, filed June 29, 1964, by Carl Berger et al., now abandoned; and Ser. No. 499,294, filed Oct. 21, 1965, by Carl Berger et al., now Patent No. 3,379,570. However, such inorganic separators are in the form of rigid membranes or plates and thus such rigid porous inorganic separators cannot be assembled as in the case of the flexible organic semi-permeable separators of the prior art, by wrapping around the electrode plates of a multiplate cell or battery.

The instant invention provides a means by which flexible sheet materials can be combined with substantially rigid inorganic separators arranged so that such inorganic separators can be placed between electrode pairs of a multiplate cell and the flexible sheet permits the unit to be wrapped around the electrode plates.

Thus, a separator construction is provided according to the invention for use in multiple plate cells, comprising a sheet of any suitable flexible material which is resistant to chemical attack, e.g., an organic plastic material, having a plurality of spaced openings therein, and a plurality of porous substantially rigid inorganic separators are positioned in said openings and connected to said plastic sheet. Thus, there is provided a plurality of such inorganic separators mounted in spaced relation on the plastic sheet.

Since the sheet on which the substantially rigid inorganic separator membranes or plates are mounted is in the form of a flexible, preferably synthetic resinous, sheet, the separator construction as a unit can be mounted in a battery comprising a plurality of alternate positive electrodes and a plurality of alternate negative electrodes, by wrapping the sheet around the electrodes with each of the porous inorganic separators disposed between an adjacent pair of positive and negative electrodes. The separator unit or construction is positioned with respect to the electrodes so that preferably the substantially rigid porous separators are substantially coextensive with the adjacent electrodes and the adjacent inorganic rigid separators are disposed substantially opposite each other and separated by the alternate positive and negative electrodes or electrode plates.

The separator construction described above can be assembled around the electrodes which are positioned in the battery case, or alternatively and according to a preferred embodiment, such separator can be wrapped or assembled around a series of electrodes with the inorganic separator elements properly positioned between positive and negative pairs of electrodes, as above described, and the resulting assembly in which the electrodes are supported by the flexible plastic sheet, can be inserted and positioned as a unit in the battery case.

As previously pointed out, the separator construction of the invention can be incorporated in any form of multiplate cell or battery, including the above noted conventional lead-acid multiplate cell, and the multiplate high energy density batteries such as a multiplate zinc-silver, silver-cadmium of nickel-cadmium battery.

The invention will be more clearly understood by reference to the description below of certain preferred embodiments, taken in connection with the accompanying drawing wherein.

Figure 1:
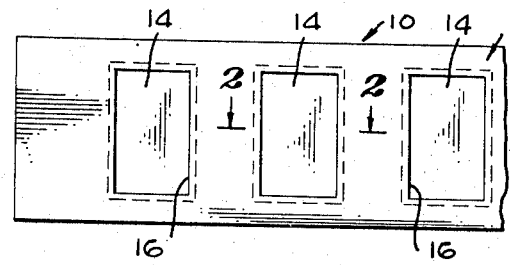
FIG. 1 is a plan view of a flexible plastic sheet having mounted thereon a plurality of spaced rigid separators according to the invention.

The illustrations in the drawing are exaggerated for purposes of greater clarity.

Referring to FIG. 1, numeral 10 represents an inorganic separator construction according to the invention, comprising a flexible plastic sheet 12 on which a plurality of rigid inorganic separator membrbanes or plates 14 are mounted in spaced relation. The plastic sheet 12 is preferably formed of a flexible synthetic resin which can be substantially impermeable or semipermeable. Any suitable type of flexible synthetic resin or plastic having good strength characteristics and inertness to chemical solutions can be employed as the sheet or web 12 on which the rigid or stiff inorganic separators 14 are mounted. Thus, for example, the flexible plastic sheet 10 can be composed of Teflon (tetrafluoroethylene polymer), Celcon (chlorofluoroethylene polymer), Delrin (a polyformaldehyde), nylon (a polyamide), and the like.

The inorganic separator material which can be used to form the rigid inorganic separator plate 14 can include a variety of inorganic substances. Thus, for example, suitable inorganic separator materials include insoluble hydrous metal oxides such as the hydrous oxides of zirconium, titanium, antimony, tungsten, silicon, scandium, bismuth, vanadium, aluminum and cerium. Such hydrous metal oxide separator materials and their method of preparation are described in the copending application Ser. No. 379,093, filed June 30, 1964, of Carl Berger et al. A preferred separator of this type is hydrous zirconium oxide or zirconia.

Other porous inorganic materials which can be employed for producing the separator according to the invention include the aluminosilicates, particularly the alkali metal and alkaline earth metal aluminosilicates, due to their formation of a hard ceramic material upon sintering, while still retaining suitable porous characteristics. The aluminosilicate separators, preferably in sintered form, have relatively low internal resistance. Examples of such aluminosilicates include aluminosilicate, sodium and potassium aluminosilicates, and magnesium, calcium, barium and strontium aluminosilicates These materials can be used separately, but often mixtures of these aluminosilicates are used, e.g., complex mixtures of both the alkali metal and alkaline earth metal aluminosilicates. Such inorganic separator materials are described in the above mentioned copending U.S. applications Ser. Nos. 378,858 and 499,294 of Carl Berger et al.

Figure 2:
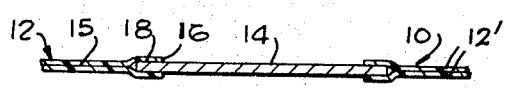
FIG. 2 is a partial section taken on line 2—2 of FIG. 1.

The flexible plastic sheet 12 is formed of two sheet portions 12' which are secured together in any suitable manner as by adhesive, heat sealing, and the like, along their contacing surfaces 15, as seen in FIG. 2. The sheet 12 is provided with a series of openings or windows 16 disposed lengthwise of the sheet or web, such openings being equally spaced from each other along the web 12 and of substantially the same size. The rigid inorganic, e.g., aluminosilicate, separators 14 are of a size or have dimensions approximately equal to or slightly greater than the size of the openings 16 in the sheet 12. The inorganic separator plates or membranes 14 are attached to sheet 12 at the openings 16 therein, in any suitable manner. Thus, for example, as illustrated in FIG. 2, the stiff inorganic membranes, e.g., sintered aluminosilicate separators, can be of a size slightly greater than the openings 16 of the web so that the separators 14 can be positioned in such openings 16, and the slightly overlapping periphery of the separator 14 attached as by cementing at 18, between the plastic sheet portions 12' about the periphery of the openings 16 therein, using a suitable cement for this purpose. If desired, other means for connecting the stiff inorganic separators 14 to the plastic sheet 12 can be employed such as heat sealing or molding such separators in place by compression or injection molding. As illustrated in FIG. 2, the respective substantially rigid inorganic separators 14 completely cover and overly the openings 16 formed in the plastic sheet 12.

The unitary flexible plastic sheet or web 12 can be of varying thickness provided it is sufficiently flexible to permit bending same into a sinuous or coiled shaped of the nature described more fully below. Thus, the thickness of such plastic sheet can range from about .005 to about .030 inch. The thickness of the inorganic separators or membranes 14 also can vary, and can range, for example, from about .010 inch to about .030 inch. The thickness of the separators, if desired, can be approximately equal to the thickness of the flexible plastic sheet.

Figure 3:
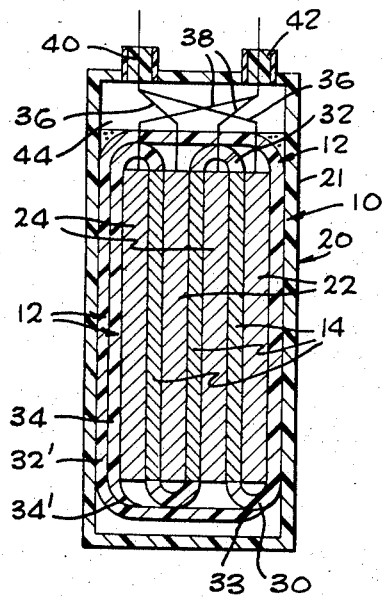
FIG. 3 illustrates a multiplate battery having the flexible plastic sheet and combined inorganic separator unit of FIG. 1 incorporated therein and wrapped in sinuous fashion around the electrode plates.

Referring now to FIG. 3 of the drawing illustrating incorporation of the separator structure 10 of FIG. 1 in a multiplate battery, numeral 20 represents a multiplate battery comprising a case 21 formed of any suitable material such as a plastic, e.g., Teflon, having positioned therein a plurality, here shown as two in number, of alternate positive plates, e.g., silver electrode plates, 22, and an equal number of alternate negative plates, e.g., zinc electrode plates, 24 disposed between the positive plates 22. Such plates can be mounted in any suitable well known manner in the battery case 21.

The separator construction of FIG. 1 can be incorporated in battery 20 by bending or flexing the plastic sheet 12 and wrapping same around the alternate electrode plates 22 and 24 in a sinuous manner as seen in FIG. 3. The separator construction 10 is so positioned in this manner that the stiff inorganic separators are each positioned between a pair of electrode plates of opposite polarity, that is between an electrode plate 22 and an adjacent electrode plate 24. Each of the inorganic separators 14 is substantially in contact with the adjacent surfaces of the adjacent electrode plates 22 and 24, and preferably, as illustrated in FIG. 3, each of the separators 14 is substantially coextensive, preferably both in length and in width, with the adjacent electrode plates 22 and 24. The plastic sheet portions of the plastic web 12 between adjacent separators 14 are coiled alternately around the bottom of an electrode plate as at 30 and around the top of the adjacent electrode plate as at 32, and so on in a sinuous manner around the various electrode plates. In the separator construction 10 shown in FIG. 3 there is provided an elongated end portion 32' of the sheet which is wrapped around the entire electrode assembly and is attached by suitable means as by cementing at its outer end 33 to the lower lobe or bend 30 of the plastic sheet 12 shown at the right in FIG. 3. It will be seen that in the embodiment of the separator construction shown in FIG. 3, the opposite end 34 of the plastic sheet can be connected to the elongated end portion 32' of such sheet by suitable means, e.g., by cementing as illustrated at 34'.

Each of the positive electrode plates 22 is provided with a terminal wire 36, and each of the other electrode plates 24 of opposite polarity is provided with a similar terminal wire 38, the terminal wires 36 being connected to one terminal 40 of the battery and the terminal wires 38 being connected to a second terminal 42 of the battery. Electrolyte, for example, acid in the case of a lead-acid storage battery, or an alkali solution such as potassium hydroxide solution in the case of a high energy density battery such as a silver-zinc battery, can be provided in the electrode compartment 44, and if desired the separators 14 can be initialy impregnated with electrolyte solution, such as KOH solution.

The resulting battery illustrated in FIG. 3 in the form of a multiplate zinc-silver battery functions efficiently, has a long life resulting from the use of the inorganic separators 14 in accordance with the separator construction of the invention, and the separator construction is easily and quickly assembled in the battery with the separators 14 properly positioned between adjacent electrode plates.

Figure 4:
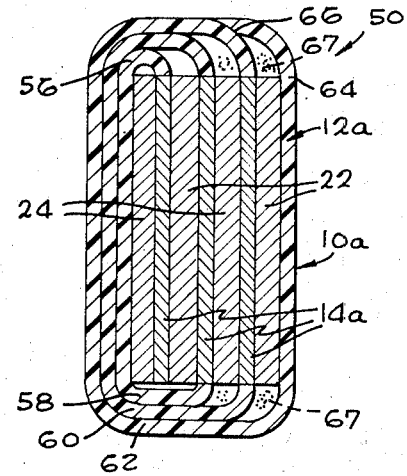
FIG. 4 illustrates an assembly comprising a separator unit according to the invention in the form of a flexible plastic sheet with rigid inorganic separators mounted theren, disposed in the form of a coil around and supporting positive and negative electrode plates.

Referring to FIG. 4, there is shown an assembly 50 composed of a separator construction 10a of a type similar to that illustrated at 10 in FIG. 1, formed of a plastic sheet 12a having stiff inorganic separators 14a mounted thereon. The sheet 12a is positioned around positive and negative electrode plates 22 and 24 by flexing and winding the plastic sheet 12a having the stiff inorganic separators 14a positioned between adjacent fashion about the respective electrode plates.

In the embodiment of FIG. 4, it will be noted that the flexible plastic sheet 12a, commencing at the first coil 56 thereof, is wrapped in successive coils 58, 60 and 62 around the battery pack or electrodes, with each of the inorganic separators 14a positioned between adjacent electrode plates 22 and 24 of the battery pack, and the separators 14a disposed substantially opposite each other. The end portion 64 of the plastic sheet is connected back unto itself, as by cementing, at the top of the last coil 62 of the plastic sheet, as illustrated at 66. When the separator construction is so disposed about the electrodes 22 and 24, the electrodes are supported in position by the coiled sheet 12a. In this embodiment, however, wherein the plastic sheet 12a is coiled around the electrodes, it will be seen that the separators 14a are not spaced equally from each other along the plastic sheet 12a, but rather the separator construction 10a is designed so that the distance between such separators 14a will vary in relation to the length of the coils 58, 60, 62, and the like, required to position the separators between adjacent electrodes. If desired, although not necessarily, the spaces between the coils 58, 60 and 62 of the assembly or unit 50 can be filled with a potting compound such as an epoxy, a polyurethane or a phenolic resin, as indicated at 67, to form a more compact unit and to positively maintain the separators 14a adjacent the electrodes 22 and 24, or the entire assembly 50 can be encapsulated in such potting material.

Figure 5:
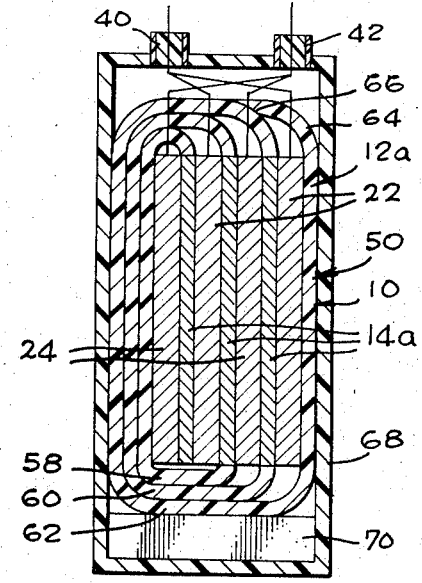
FIG. 5 shows a battery having incorporated therein the separator-electrode assembly shown in FIG. 5.

The separator-electrode unit 50 of FIG. 4 can then be positioned in a battery case 68, as illustrated in FIG. 5, by supporting the unit 50 on a base 70 in the case.

The provision of a unit composed of the separator construction of the invention such as 10a, wrapped around and supporting the electrodes, and which can be readily inserted into a battery case, with suitable electrical connections provided between the respective electrodes and the battery terminals, as illustrated in FIGS. 4 and 5, constitutes a preferred mode of practice of the invention. It will be understood that the separator construction 10 of FIG. 1 also can be assembled with the electrodes 22 and 24, in the sinuous fashion shown in FIG. 3, and the resulting assembly inserted as a unit into the battery case 21.

From the foregoing, it is seen that the invention provides a novel separator construction especially designed for incorporation and use in multiple plate batteries or cells, which combines the efficient rigid inorganic separator membranes or plates described above and in the above mentioned copending applications, with a flexible sheet, preferably an organic flexible plastic sheet, thus permitting facile positioning and maintenance of the inorganic separators in proper position between electrodes of opposite polarity. The incorporation of a separator construction according to the invention into a multiplate battery provides an efficient battery of long life and dependability.

While I have described particular embodiments of the invention for purposes of illustration, it will be understood that various changes and modifications can be made therein within the spirit of the invention, and the invention accordingly is not to be taken as limited except by the scope of the appended claims.

I claim:

1. A separator construction for use in multiple plate cells, comprising a flexible sheet having a plurality of spaced openings therein, and a plurality of porous substantially rigid inorganic separators positioned in said openings and connected to said flexible sheet, and providing a plurality of said inorganic separators mounted in spaced relation on said plastic sheet.

2. A separator construction as defined in claim 1, wherein said flexible sheet is formed of an organic plastic material.

3. A separator construction as defined in claim 2, said organic plastic material being a flexible synthetic resin, and said inorganic separators being selected from the group consisting of a porous insoluble hydrous metal oxide and a porous aluminosilicate.

4. A separator construction as defined in claim 2, said organic plastic material being bent in a sinuous form, with adjacent inorganic separators disposed substantially opposite each other.

5. A separator construction as defined in claim 2, said organic plastic material being bent in a coiled form, with adjacent inorganic separators disposed substantially opposite each other.

6. A separator construction as defined in claim 2, said organic plastic material being bent in a sinuous form, with adjacent inorganic separators disposed substantially opposite each other, said inorganic separators being selected from the group consisting of a porous insoluble hydrous metal oxide and a porous aluminosilicate.

7. A separator construction as defined in claim 2, said organic plastic material being bent in a coiled form, with adjacent inorganic separators disposed substantially opposite each other, said inorganic separators being selected from the group consisting of a porous insoluble hydrous metal oxide and a porous aluminosilicate.

8. A separator construction as defined in claim 2, said organic plastic material being bent in a sinuous form, with adjacent inorganic separators disposed substantially opposite each other, said inorganic separators being in the form of porous sintered aluminosilicate plates.

9. A separator construction as defined in claim 2, said organic plastic material being bent in a coiled form, with adjacent inorganic separators disposed substantially opposite each other, said inorganic separators being in the form of porous sintered aluminosilicate plates.

10. A separator construction as defined in claim 1, wherein said openings in said sheet are equally spaced and of substantially the same size.

11. A separator as defined in claim 1, wherein said openings in said sheet are spaced unequally from each other, and are of substantially the same size.

12. A battery unit comprising a plurality of alternate positive electrodes and a plurality of alternate negative electrodes, and a separator construction comprising a flexible sheet carrying a plurality of porous substantially rigid inorganic separators positioned in spaced relation to each other, said sheet being wrapped around said electrodes with each of said porous inorganic separators disposed between an adjacent pair of positive and negative electrodes.

13. A battery unit as defined in claim 12, said sheet being formed of an organic plastic material having a plurality of spaced openings therein, and said porous inorganic separators positioned in said openings and connected to said plastic sheet, and providing said plurality of said inorganic separators mounted in spaced relation on said plastic sheet.

14. A battery unit as defined in claim 13, said organic plastic material being a flexible synthetic resin, and said inorganic separators being selected from the group consisting of a porous insoluble hydrous metal oxide and a porous aluminosilicate.

15. A battery unit as defined in claim 13, said organic plastic material being flexible and bent in a sinuous form, with adjacent inorganic separators disposed substantialy opposite each other, and said separators being substantially coextensive with said electrodes.

16. A battery unit as defined in claim 13, said organic plastic material being flexible and bent in a coiled form, with adjacent inorganic separators disposed substantially opposite each other, and said separators being substantially coextensive with said electrodes.

17. A battery unit as defined in claim 13, said organic plastic material being a flexible synthetic resin, and said inorganic separators being in the form of porous sintered aluminosilicate plates.

18. A battery comprising a case, a plurality of alternate positive electrodes and a plurality of alternate negative electrodes in said case, a separator construction disposed in said case in relation to said electrodes, said separator construction comprising a sheet of an organic plastic material carrying a plurality of porous substantially rigid inorganic separators positioned in spaced relation to each other, said sheet being wrapped around said electrodes with each of said porous inorganic separators disposed between an adjacent pair of positive and negative electrodes, electrical leads connected to said positive electrodes and electrical leads connected to said negative electrodes.

19. A battery as defined in claim 18, said organic plastic material being a flexible synthetic resin, and said inorganic separators being selected from the group consisting of a porous insoluble hydrous metal oxide and a porous aluminosilicate.

20. A battery as defined in claim 18, said organic plastic material being flexible and bent in a sinuous form, with adjacent inorganic separators disposed substantially opposite each other, and said separators being substantially coextensive with said electrodes.

21. A battery as defined in claim 18, said organic plastic material being flexible and bent in a coiled form, with adjacent inorganic separators disposed substantially opposite each other, and said separators being substantially coextensive with said electrodes.

22. A battery as defined in claim 18, said positive electrodes being silver electrode plates and said negative electrodes being zinc electrode plates, said organic plastic material being a flexible synthetic resin, and said inorganic separators being in the form of porous sintered aluminosilicate plates, said separator plates being substantially coextensive with said electrodes.

References Cited

UNITED STATES PATENTS

| | | | |
|---|---|---|---|
| 2,490,630 | 12/1949 | Jardine | 136—147 |
| 2,858,352 | 10/1958 | Solomon | 136—145 |
| 2,928,888 | 3/1960 | Vogt | 136—6 |
| 3,004,094 | 10/1961 | Haessly | 136—175 |
| 3,239,380 | 3/1966 | Berchielli | 136—6 |

WINSTON A. DOUGLAS, *Primary Examiner.*

A. SKAPARS, *Assistant Examiner.*

U.S. Cl. X.R.

136—83; 145